(12) United States Patent
Unno et al.

(10) Patent No.: US 10,705,500 B2
(45) Date of Patent: Jul. 7, 2020

(54) SUPPORT DEVICE, METHOD, AND RECORDING MEDIUM FOR SIMPLIFYING CONTROL PROGRAM CHANGING OPERATION

(71) Applicant: OMRON Corporation, Kyoto (JP)

(72) Inventors: Takashi Unno, Moriyama (JP); Takashi Sakuma, Ibaraki (JP)

(73) Assignee: OMRON Corporation, Kyoto (JP)

( * ) Notice: Subject to any disclaimer, the term of this patent is extended or adjusted under 35 U.S.C. 154(b) by 140 days.

(21) Appl. No.: 15/576,287

(22) PCT Filed: Jul. 28, 2016

(86) PCT No.: PCT/JP2016/072126
§ 371 (c)(1),
(2) Date: Nov. 22, 2017

(87) PCT Pub. No.: WO2017/026290
PCT Pub. Date: Feb. 16, 2017

(65) Prior Publication Data
US 2018/0210415 A1 Jul. 26, 2018

(30) Foreign Application Priority Data
Aug. 10, 2015 (JP) .................................. 2015-158172

(51) Int. Cl.
*G05B 19/05* (2006.01)

(52) U.S. Cl.
CPC .... *G05B 19/056* (2013.01); *G05B 2219/1105* (2013.01); *G05B 2219/1134* (2013.01);
(Continued)

(58) Field of Classification Search
CPC .................................................... G05B 19/056
(Continued)

(56) References Cited

U.S. PATENT DOCUMENTS 7,225,037 B2 * 5/2007 Shani ................... G05B 19/056
700/18
7,752,511 B2 * 7/2010 Fulton .................. G05B 19/058
714/725
(Continued)

FOREIGN PATENT DOCUMENTS

| CN | 1385770 | 12/2002 |
| CN | 1533499 | 9/2004 |

(Continued)

OTHER PUBLICATIONS

Olivera Pavlovi'et al.: "Model Checking PLC Software Written in Function Block Diagram"; 2010 Third International Conference on Software Testing, Verification and Validation—2010 IEEE.*
(Continued)

*Primary Examiner* — Francisco J Aponte
(74) *Attorney, Agent, or Firm* — JCIPRNET (57) ABSTRACT

The purpose of the invention is the simplification of a task of changing a control program upon a control device which is in use. A support device comprises: a computing part computing, for each unit program which configures a control program, identification information according to the content of each of the unit programs; a first transferring part transferring the unit programs and the identification information which is associated with the unit programs to a control device; a generating part generating changed unit programs according to a change operation upon any of the unit programs which configure the control program; and a second transferring part transferring the changed unit programs to a control device which is in use on condition that identification information is present on the control device which is identical to the identification information which is associated with the unit programs which configure the control program.

6 Claims, 9 Drawing Sheets

(52) U.S. Cl.
CPC .............. *G05B 2219/13004* (2013.01); *G05B 2219/13134* (2013.01); *G05B 2219/13144* (2013.01); *G05B 2219/13153* (2013.01)

(58) Field of Classification Search
USPC ......................................................... 700/34
See application file for complete search history.

(56) References Cited

U.S. PATENT DOCUMENTS

| | | | | |
|---|---|---|---|---|
| 8,117,424 | B2* | 2/2012 | Boggs | G05B 19/056 712/223 |
| 8,136,032 | B2 | 3/2012 | Yamakado | |
| 8,195,844 | B2* | 6/2012 | Fulton | G05B 19/05 710/15 |
| 8,327,316 | B2* | 12/2012 | Chouinard | G05B 19/056 717/100 |
| 8,352,651 | B2* | 1/2013 | Parfitt | G05B 19/054 326/37 |
| 8,433,831 | B2* | 4/2013 | Ost | G05B 19/056 326/37 |
| 9,618,922 | B2* | 4/2017 | Nishiyama | G05B 19/05 |
| 9,753,447 | B2* | 9/2017 | Sawaragi | G05B 19/056 |
| 9,778,652 | B2* | 10/2017 | Nausley | G05B 23/0221 |
| 9,964,943 | B2* | 5/2018 | Kanemaru | G05B 19/4103 |
| 10,082,777 | B2* | 9/2018 | Nishiyama | G05B 19/04 |
| 10,162,328 | B2* | 12/2018 | Takeuchi | G05B 19/056 |
| 10,180,674 | B2* | 1/2019 | Yaoita | G05B 19/0426 |
| 10,394,213 | B2* | 8/2019 | Kim | G05B 19/29 |
| 10,416,653 | B2* | 9/2019 | Maeda | G05B 19/0426 |
| 2006/0190624 | A1* | 8/2006 | Kegoya | G05B 19/042 709/246 |
| 2006/0253838 | A1* | 11/2006 | Fujii | G06F 9/44505 717/124 |
| 2007/0174518 | A1* | 7/2007 | Chandhoke | G05B 19/054 710/62 |
| 2007/0203676 | A1* | 8/2007 | Jinzenji | G05B 19/052 702/189 |
| 2008/0127065 | A1* | 5/2008 | Bryant | G05B 19/056 717/109 |
| 2009/0064103 | A1* | 3/2009 | Shih | G05B 19/056 717/113 |
| 2009/0083705 | A1* | 3/2009 | Phillips | G05B 19/056 717/113 |
| 2010/0083213 | A1* | 4/2010 | Chouinard | G06F 8/20 717/104 |
| 2010/0083232 | A1* | 4/2010 | Chouinard | G06F 21/10 717/124 |
| 2010/0174387 | A1* | 7/2010 | Ono | G05B 19/05 700/23 |
| 2010/0220593 | A1* | 9/2010 | Fujiwara | H04L 47/10 370/235 |
| 2011/0099540 | A1* | 4/2011 | Bae | G06F 11/3664 717/135 |
| 2011/0302393 | A1* | 12/2011 | Matsumoto | G06F 9/3017 712/221 |
| 2012/0158159 | A1* | 6/2012 | Kuroiwa | F24F 11/30 700/83 |
| 2012/0192267 | A1 | 7/2012 | Aizawa | |
| 2012/0222001 | A1* | 8/2012 | Nakai | G05B 19/0426 717/110 |
| 2012/0291036 | A1* | 11/2012 | Taira | B25J 9/1656 718/102 |
| 2013/0144406 | A1* | 6/2013 | Blei | G05B 19/054 700/28 |
| 2014/0058538 | A1* | 2/2014 | Yaoita | G06F 11/3636 700/28 |
| 2014/0058565 | A1* | 2/2014 | Shimamura | G05B 19/056 700/275 |
| 2014/0088735 | A1* | 3/2014 | Hamasaki | G05B 19/042 700/40 |
| 2015/0005907 | A1* | 1/2015 | Yamaoka | G06F 17/5054 700/83 |
| 2015/0205966 | A1* | 7/2015 | Chowdhury | G06F 21/577 726/23 |

FOREIGN PATENT DOCUMENTS

| | | |
|---|---|---|
| CN | 1677290 | 10/2005 |
| CN | 1945483 | 4/2007 |
| CN | 101261506 | 9/2008 |
| CN | 101932998 A | 12/2010 |
| CN | 102257477 A | 11/2011 |
| CN | 103403633 | 11/2013 |
| CN | 101932998 B | 1/2014 |
| CN | 103562807 | 2/2014 |
| CN | 102257477 B | 4/2015 |
| JP | H05-297902 | 11/1993 |
| JP | H10301763 | 11/1998 |
| JP | 2001-142510 | 5/2001 |
| JP | 2008-077265 | 4/2008 |
| JP | 2008282363 | 11/2008 |
| JP | 2009-223590 | 10/2009 |
| JP | 5039428 | 10/2012 |
| JP | 2013073527 | 4/2013 |
| JP | 2013-168031 | 8/2013 |

OTHER PUBLICATIONS

Mirosław Chmiel et al.: "Popular Microcontrollers Execute IEC 61131-3 Standard Operators and Functional Blocks in Simply Automatic Control Tasks"—2015 IEEE.*
"Search Report of Europe Counterpart Application", dated Mar. 4, 2019, p. 1-p. 9.
"Office Action of Japan Counterpart Application", dated Dec. 4, 2018, with English translation thereof, p. 1-p. 7.
"International Search Report (Form PCT/ISA/210) of PCT/JP2016/072126", dated Sep. 27, 2016, with English translation thereof, pp. 1-4.
"Written Opinion (Form PCT/ISA/237)", dated Sep. 27, 2016, with English translation thereof, pp. 1-8.
Office Action of China Counterpart Application, with English translation thereof, dated Jun. 20, 2019, pp. 1-14.

* cited by examiner

DATA IS TRANSFERRED TO PLC IN FOLLOWING ORDER.

| TRANSFER ORDER | DATA NAME | COMMENTS |
|---|---|---|
| 1 | GLOBAL VARIABLE TABLE | |
| 2 | LADDER FUNCTION 0 | |
| 3 | LADDER FUNCTION BLOCK 0 | |
| 4 | LADDER FUNCTION BLOCK 1 | |
| 5 | LADDER FUNCTION 1 | |
| 6 | LADDER FUNCTION BLOCK 2 | |
| 7 | LADDER PROGRAM 0 | |
| 8 | LADDER PROGRAM 1 | |

SUPPORT DEVICE, METHOD, AND RECORDING MEDIUM FOR SIMPLIFYING CONTROL PROGRAM CHANGING OPERATION

CROSS-REFERENCE TO RELATED APPLICATION

This application is a 371 of international application of PCT application serial no. PCT/JP2016/072126, filed on Jul. 28, 2016, which claims the priority benefit of Japan application no. 2015-158172, filed on Aug. 10, 2015. The entirety of each of the above-mentioned patent applications is hereby incorporated by reference herein and made a part of this specification.

BACKGROUND OF THE INVENTION

1. Technical Field

The present invention relates to a support device for supporting the development of a control program to be executed in a control device that controls a control target, a method to be executed in the support device, and a recording medium whereon a support program for implementing the support device is stored.

2. Description of Related Art

A control device such as a programmable logic controller (PLC) is introduced at various manufacturing sites. Such a control device is a type of computer and a control program designed in accordance with a manufacturing device, a manufacturing facility, or the like is executed. Such a control program is created in a development environment provided separately from the control device. A device configured to provide a development environment and provide a function of uploading the control program to the control device or downloading the control program to the control device is also referred to as a support device.

In many cases, it is not easy to stop a manufacturing device that is a control target. Even when a control program to be executed in a control device is desired to be partially revised, usability is poor if the control program cannot be updated unless the control device is temporarily stopped. Thus, it is preferable to implement an online edit function of rewriting a part of the control program to be executed when the control device is in operation.

For example, Japanese Unexamined Patent Application Publication No. 2009-223590 (Patent Literature 1) discloses an online edit operation of rewriting an object code stored in a PLC by an object code part obtained by converting a part of a source program through a compiler.

CITATION LIST

Patent Literature

Patent Literature 1: Japanese Unexamined Patent Application Publication No. 2009-223590

SUMMARY OF THE INVENTION

Technical Problem

Although a program development support device disclosed in the above-mentioned Patent Literature 1 is assumed to mainly perform the online edit operation on a specific PLC, a plurality of PLCs normally execute similar control programs in an actual manufacturing line or the like. In such circumstances, when the same modification is applied to control programs to be executed in a plurality of PLCs, there is a possibility that similar operations equal in number to installed PLCs should be performed and unintended problems are caused. An objective of the present invention is to solve such problems.

Solution to Problem

According to an aspect of the present invention, a support device for supporting development of a control program to be executed in a control device that controls a control target is provided. The support device includes a computing part configured to compute identification information in accordance with details of each unit program with respect to each unit program constituting the control program; a first transferring part configured to transfer a unit program and identification information associated with the unit program to the control device; a generating part configured to generate a changed unit program in accordance with a change operation on any one unit program constituting the control program; and a second transferring part configured to transfer the changed unit program to the control device in operation on condition that the same identification information as identification information associated with a unit program constituting the control program is present in the control device.

Preferably, the second transferring part transfers the changed unit program to the control device on condition that all of corresponding identification information is present in the control device with respect to each of one or more unit programs on which any change operation is performed among a plurality of unit programs constituting the control program.

Preferably, the computing part computes the identification information from a program code or a program object of each unit program by using a hash function.

Preferably, the generating part limits a change operation of which an instruction is possible so that the change operation is suitable for a limitation when the changed unit program is transferred for the control device in operation.

Preferably, the generating part generates a changed variable table in accordance with a change operation on a variable table constituting the control program, and the second transferring part transfers the changed variable table to the control device on condition that all details of the variable table before a change are included in the changed variable table.

Further, preferably, the second transferring part transfers a variable table of a transfer target and one or more unit programs in a predetermined order or a designated order.

Further, preferably, the second transferring part deteu lines a transfer order of a variable table of a transfer target and one or more unit programs in accordance with a characteristic value of the control device of a transfer destination.

According to another aspect of the present invention, a method to be executed in a support device for supporting development of a control program to be executed in a control device that controls a control target is provided. The present method includes the steps of: computing identification information in accordance with details of each unit program with respect to each unit program constituting a first program; transferring a unit program and identification information associated with the unit program to the control device; generating a changed unit program in accordance with a change operation on any one unit program constituting the first program; and transferring the changed unit program to the control device in operation on condition that the same identification information as identification information associated with a unit program constituting the control program is present in the control device.

According to still another aspect of the present invention, a recording medium storing a support program for implementing a support device for supporting development of a control program to be executed in a control device that controls a control target is provided. The support program causes a computer to function as: a computing part configured to compute identification information in accordance with details of each unit program with respect to each unit program constituting a first program; a first transferring part configured to transfer a unit program and identification information associated with the unit program to the control device; a generating part configured to generate a changed unit program in accordance with a change operation on any one unit program constituting the first program; and a second transferring part configured to transfer the changed unit program to the control device in operation on condition that the same identification information as identification information associated with a unit program constituting the control program is present in the control device.

Advantageous Effects of Invention

According to a support device and a support program of embodiments of the present invention, it is possible to simplify a task of changing a control program for a control device in operation.

DESCRIPTION OF THE EMBODIMENTS

Hereinafter, embodiments of the present invention will be described with reference to the drawings. Also, the same or corresponding parts in the drawings are denoted by the same reference signs and descriptions thereof will not be repeated.

<A. Configuration Example of PLC System>

Figure 1:
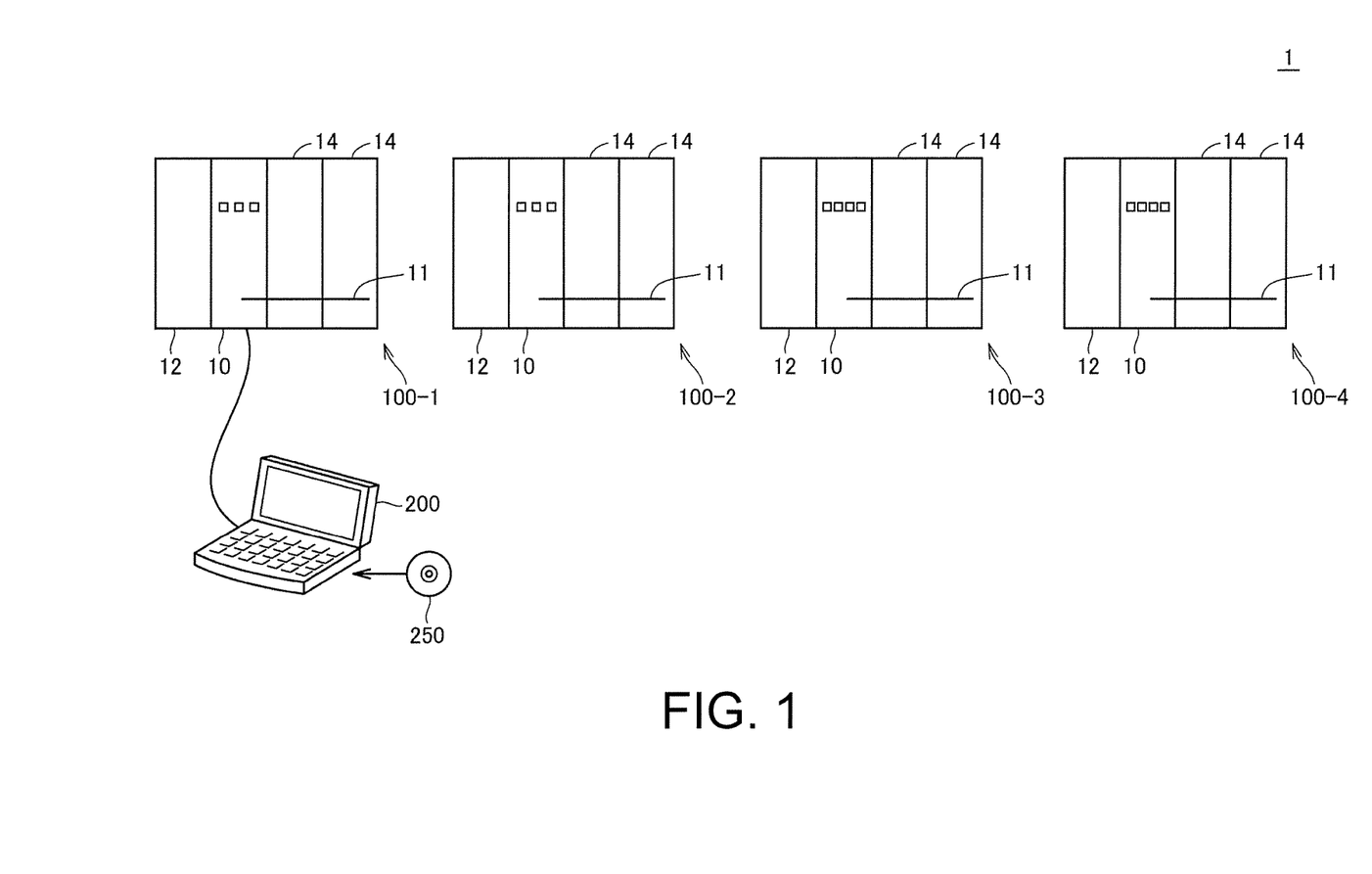
FIG. 1 is a schematic diagram illustrating a configuration example of a PLC system to which a support device according to the present embodiment is applicable.

First, a configuration example of a PLC system to which a support device according to the present embodiment is applicable will be described. FIG. 1 is a schematic diagram illustrating a configuration example of a PLC system 1 to which a support device 200 according to the present embodiment is applicable.

Referring to FIG. 1, the PLC system 1 includes a plurality of PLCs 100-1, 100-2, 100-3, 100-4, and the like (hereinafter also collectively referred to as a "PLC 100"). It is assumed that the PLCs 100 control similar manufacturing devices and control programs to be executed are also substantially the same. The support device 200 according to the present embodiment can more easily change a part of each control program for a plurality of PLCs 100 during such an operation (that is, during execution of the control program).

Each of the PLCs 100 is an example of a control device configured to control a control target. Typically, the PLC 100 includes a CPU unit 10 which is a main body configured to execute various types of programs including a control program, a power supply unit 12 configured to supply electric power to the CPU unit 10 and the like, and an input/output (I/O) unit 14 configured to exchange a signal from a field. The I/O unit 14 is connected to the CPU unit 10 via a system bus 11.

The support device 200 supports development of a control program to be executed in the PLC 100, which is a control device configured to control a control target. The support device 200 has a function of providing an environment for developing various type of programs including a control program to be executed in the PLC 100, a function of setting a control program and various types of information with respect to the PLC 100, a function of acquiring a state value of the PLC 100 in operation, and the like. Further, the support device 200 may have a debugging function and a simulation function to support the development of the control program by a user.

By installing a support program that is an application program stored in an optical recording medium 250 in the support device 200, various types of functions as described above are implemented. Instead of the optical recording medium 250, the support program may be downloaded from an external server device or the like via a network. As an example, the support device 200 is connected to the CPU unit 10 of the PLC 100 via a connection cable. The support device 200 is typically implemented by a personal computer.

<B. Hardware Configuration Example of PLC 100>

Figure 2:
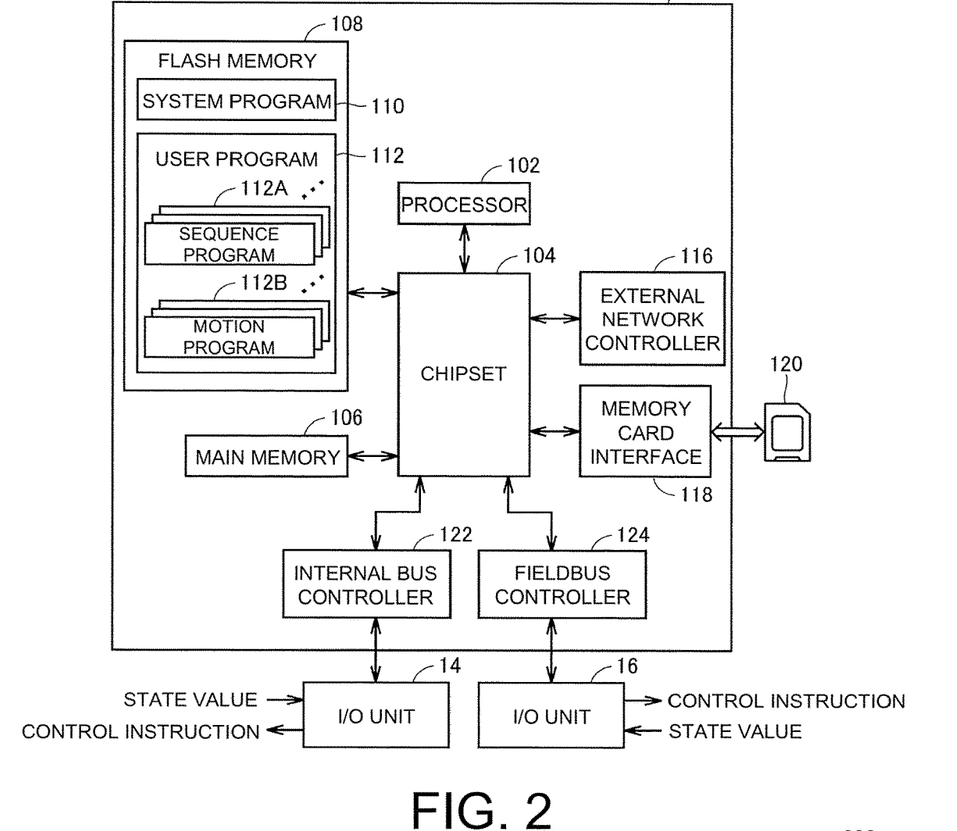
FIG. 2 is a schematic diagram illustrating a hardware configuration example of a PLC constituting the PLC system illustrated in FIG. 1.

Next, a hardware configuration example of the PLC 100 will be described. FIG. 2 is a schematic diagram illustrating a hardware configuration example of the PLC 100 constituting the PLC system illustrated in FIG. 1.

Referring to FIG. 2, the PLC 100 controls a control target by executing a pre-installed program in a processor. More specifically, the PLC 100 includes a processor 102 such as a central processing unit (CPU) or a micro-processing unit (MPU), a chipset 104, a main memory 106, a flash memory 108, an external network controller 116, a memory card interface 118, an internal bus controller 122, and a fieldbus controller 124.

The processor 102 controls the control target by reading a system program 110 and a user program 112 stored in the flash memory 108 and loading and executing the system program 110 and the user program 112 in the main memory 106. In the present description, the "control program" is a concept including the system program 110 and the user program 112. However, in an implementation scheme, the control program may include only the user program 112.

The system program 110 includes an instruction code for providing basic functions of the PLC 100 such as a data input/output process and execution timing control. The user program 112 is a type of control program arbitrarily designed in accordance with a control target and includes a sequence program 112A for executing sequence control and a motion program 112B for executing motion control.

The chipset 104 implements a process of the entire PLC 100 by controlling each component.

The internal bus controller 122 is an interface for exchanging data between the PLC 100 and the I/O unit 14 connected via the internal bus. The fieldbus controller 124 is an interface for exchanging data between the PLC 100 and the I/O unit 16 connected through a fieldbus (not illustrated). The internal bus controller 122 and the fieldbus controller 124 acquire state values input to the corresponding I/O units 14 and 16 and computation results in the processor 102 are output as command values from the corresponding I/O units 14 and 16.

The external network controller 116 controls the exchange of data via various types of wired/wireless networks. The memory card interface 118 is configured so that the memory card 120 can be attached and detached and can write data to the memory card 120 and read data from the memory card 120.

Some or all of the functions provided by the PLC 100 executing the program may be implemented by a dedicated hardware circuit.

<C. Hardware Configuration Example of Support Device 200>

Figure 3:
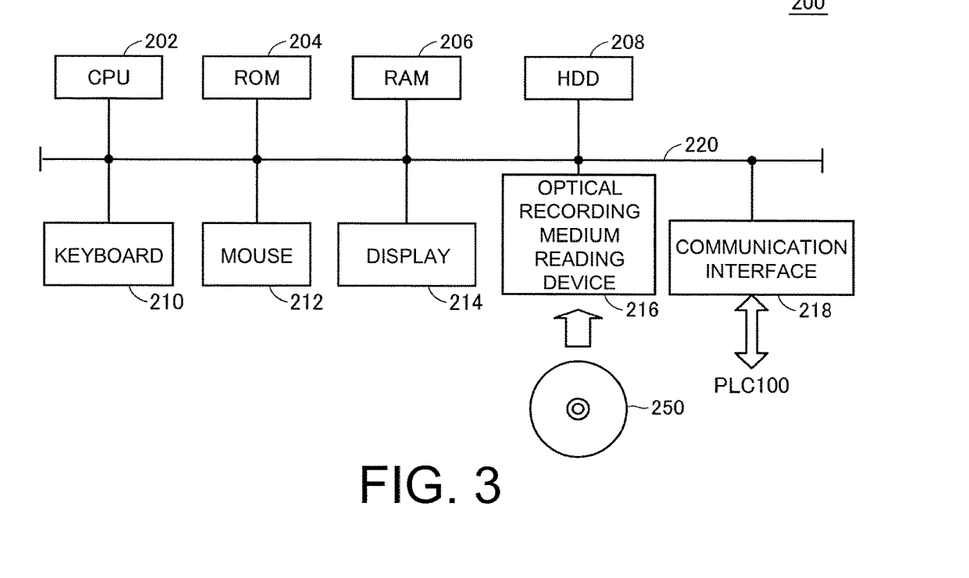
FIG. 3 is a schematic diagram illustrating a hardware configuration example of the support device constituting the PLC system illustrated in FIG. 1.

Next, a hardware configuration example of the support device 200 will be described. FIG. 3 is a schematic diagram illustrating a hardware configuration example of the support device 200 constituting the PLC system illustrated in FIG. 1. Referring to FIG. 3, the support device 200 typically includes a general-purpose computer. From the viewpoint of maintainability at the manufacturing site where the PLC 100 is disposed, a notebook type personal computer with excellent portability is preferable.

The support device 200 includes a CPU 202 configured to execute various types of programs including an operating system (OS), a read only memory (ROM) 104 configured to store a BIOS and various types of data, a memory RAM 206 configured to provide a work area for storing data required for execution of a program in the CPU 202, and a hard disk (HDD) 208 configured to store programs and the like to be executed in the CPU 202 in a non-volatile type.

The support device 200 further includes a keyboard 210 and a mouse 212 for receiving operations from the user and a display 214 for presenting information to the user. The support device 200 includes a communication interface 218 for communicating with the PLC 100 (the CPU unit 10) and the like.

The support device 200 includes an optical recording medium reading device 216 for reading a support program stored in the optical recording medium 250 from the optical recording medium 250.

<D. Software Configuration Example of PLC 100>

Figure 4:
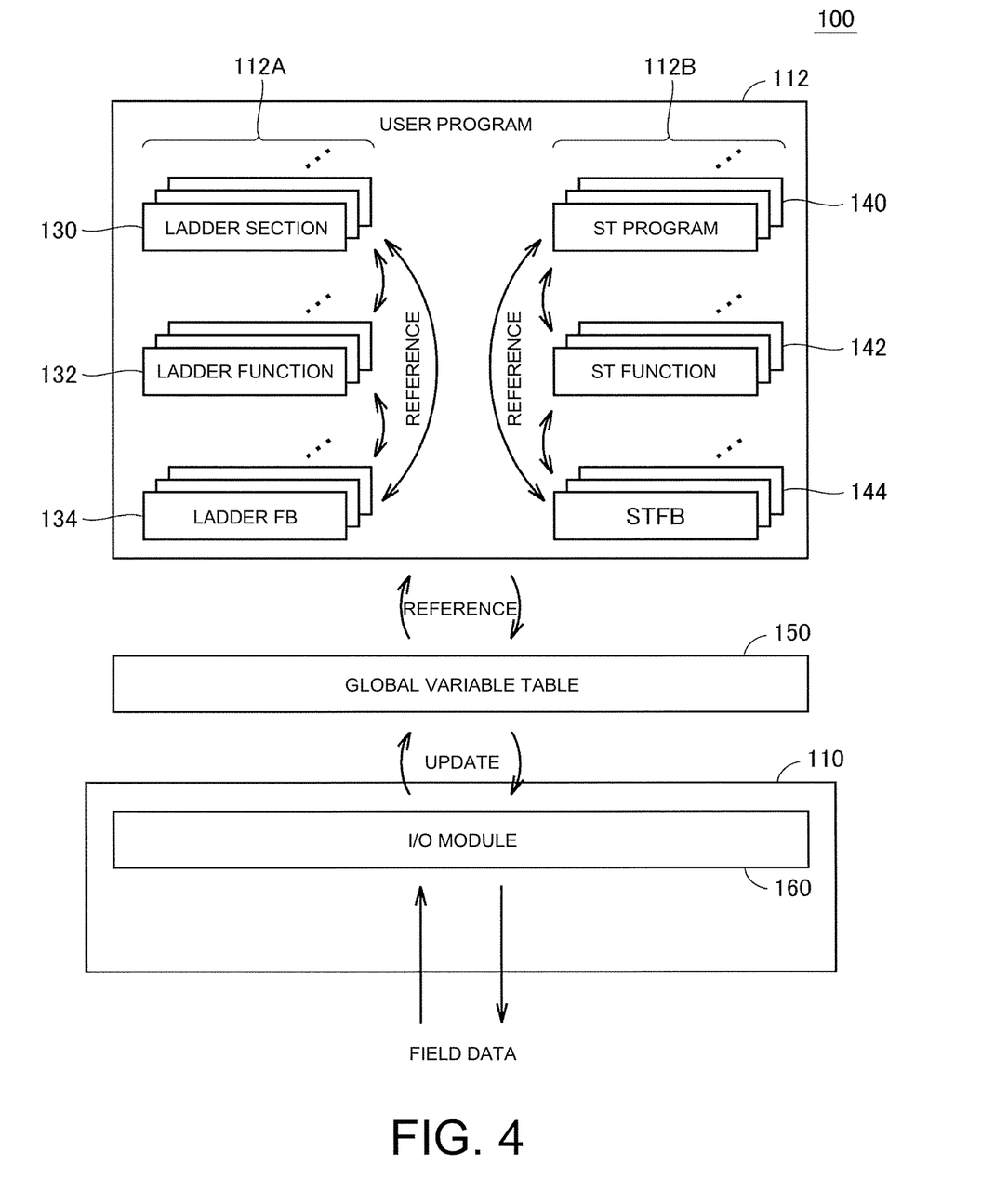
FIG. 4 is a schematic diagram illustrating a software configuration example of the PLC constituting the PLC system illustrated in FIG. 1.

Next, a software configuration example of the PLC 100 will be described. FIG. 4 is a schematic diagram illustrating a software configuration example of the PLC 100 constituting the PLC system illustrated in FIG. 1.

Referring to FIG. 4, the system program 110 and the user program 112 are executed as control programs in the PLC 100. The system program 110 has an I/O module 160 as a part of a function thereof and associates data exchanged with the field side by the I/O unit (data acquired from the field and data to be output to the field) with the global variable table 150.

Variable programming is enabled in the PLC 100 and the user program 112 can execute various types of processes by using variable values associated with the field data defined in the global variable table 150.

The sequence program 112A of the user program 112 is mainly constituted of a ladder section 130, a ladder function 132, and a ladder function block (also referred to as a "ladder FB") 134. Also, the motion program 112B of the user program 112 mainly includes a structured text (ST) program 140, an ST function 142, and an ST function block (also referred to as an "STFB") 144.

ST is a high-level language mainly for a PLC defined in IEC 61131-3. The ST program 140, the ST function 142, and the ST function block 144 are used for a human machine interface (HMI) process, a communication process, a recipe data process, and other advanced function processes as well as the motion program 112B.

The ladder section 130 includes a program described by a ladder logic language. The ladder function 132 is a combination of one or more ladder programs, is called from the ladder section 130 for execution, and returns an execution result to a calling program. The ladder function block 134 is a unit of a program combining one or more ladder programs in order to implement a specific process, and is called from one or more ladder sections 130 for execution. The ladder function 132 and the ladder function block 134 are a type of subroutine, and recursive calling is also possible.

The ST program 140 includes a program described by the ST language. The ST function 142 is a combination of one or more instructions in the ST language, is called from the ST program 140 for execution, and returns an execution result to a calling program. The ST function block 144 is a unit of a program combining instructions in one or more ST languages in order to implement a specific process and is called from one or more ST programs 140 for execution. The ST function 142 and the ST function block 144 are a type of subroutine, and recursive calling is also possible.

In the following description, each of the ladder section 130, the ladder function 132, the ladder function block 134, the ST program 140, the ST function 142, and the ST function block 144 is also referred to as a "program organization unit (POU)." If there are a plurality of functions or function blocks, each function or function block corresponds to one POU.

On the PLC 100 according to the present embodiment, an online edit function is implemented. In the online edit function, it is possible to change, update, and delete programs in units of POUs. That is, the POU is a type of unit program and is transferred to the PLC 100 for each POU. However, it is not necessary for the "unit program" to be exactly the same as the POU and a plurality of POUs may be regarded as one "unit program."

By using the online edit function, it is possible to make a necessary change to the control program while the operation of the PLC 100 continues (while the normal control program is iteratively executed).

<E. Issues and Objectives>

In the PLC system 1 as illustrated in FIG. 1, it is assumed that the PLCs 100 control similar manufacturing devices and control programs to be executed are also substantially the same. The control program to be executed in each of the plurality of PLCs 100 can be modified using the online edit function. However, in order to make similar modifications on all the PLCs 100, it is necessary to connect the support device 200 to the PLC 100 and iterate operations of changing a program or transferring a modification program equal in number to the PLCs 100.

Also, from the viewpoint of security and the like, remote access for remotely performing modification of the control program and the like with respect to the PLC 100 arranged in a production system or production line may be normally limited. Thus, at the manufacturing site where the PLC 100 is disposed, maintenance staff or the like need to iteratively modify the control program.

However, maintenance staff may not have sufficient knowledge about the PLC 100, and more task time is required by performing iterative task or there is also a possibility of the occurrence of a task error or task omission.

Thus, there is a demand for a function of further simplifying the task of making similar modifications on the control program to be executed in each of a plurality of PLCs 100 and reducing the possibility of occurrence of a task error or the like.

Therefore, the support device 200 according to the present embodiment implements a consistency checking function of determining whether or not a change can be made to the control program to be executed in the target PLC 100.

<F. Processing Procedure>

Figure 5:
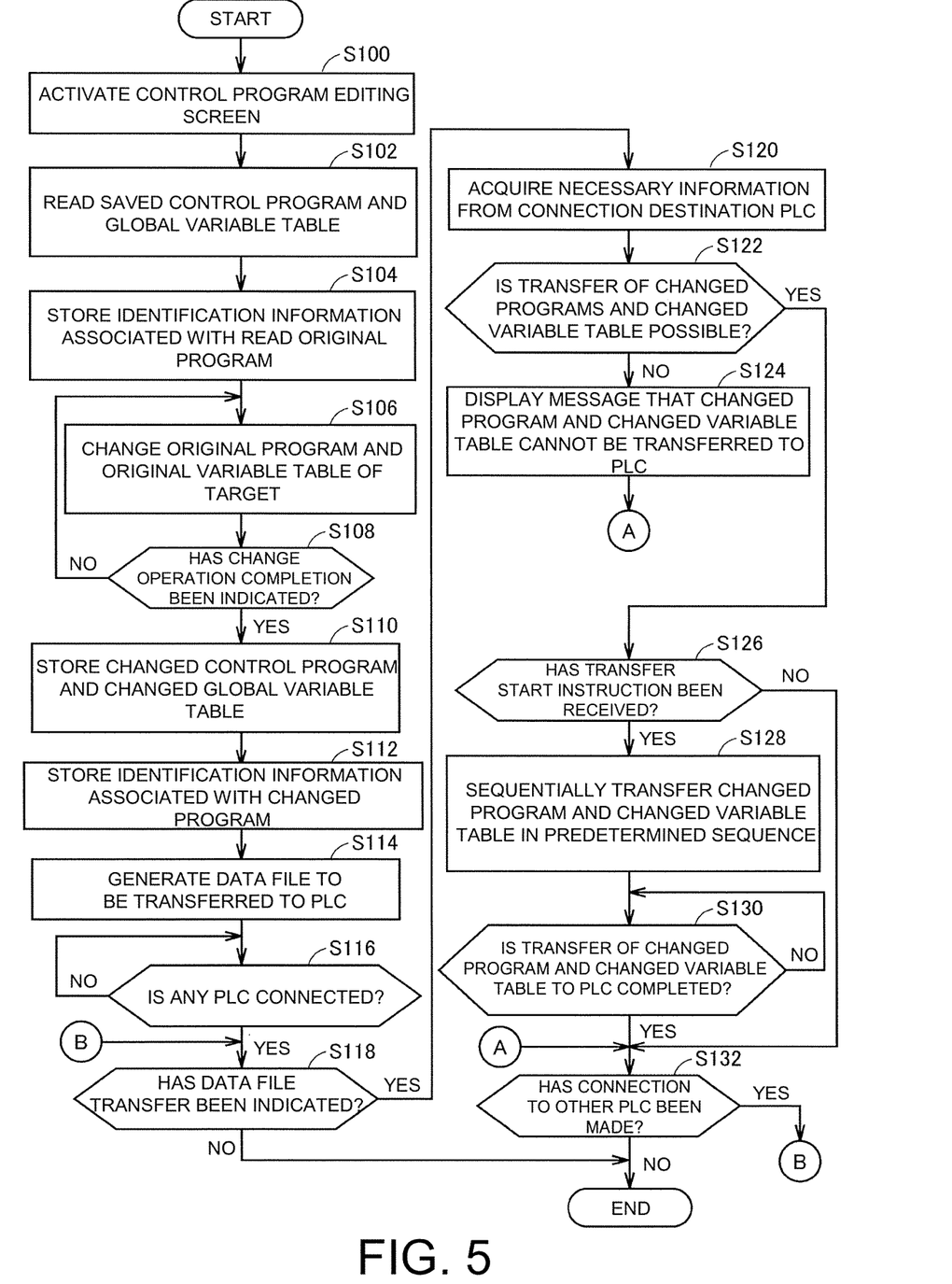
FIG. 5 is a flowchart illustrating a processing procedure when a program is changed with respect to a plurality of PLCs by using the support device according to the present embodiment.

Next, a processing procedure of changing programs for a plurality of PLCs 100 by using the support device 200 having the consistency checking function will be described. FIG. 5 is a flowchart illustrating a processing procedure when a program is changed for the plurality of PLCs 100 by using the support device 200 according to the present embodiment. Each step illustrated in FIG. 5 is implemented by the support device 200 (strictly speaking, the CPU 202 of the support device 200) executing the support program.

Referring to FIG. 5, the support device 200 executes a support device application program, activates an editing screen of the control program (step S100) and reads a control program (hereinafter also referred to as an "original program") and a global variable table (hereinafter also referred to as an "original variable table") which are saved (step S102). Then, the support device 200 stores identification information associated with the read original program (step S104).

The support device 200 has a function of computing identification information for each POU constituting the control program in accordance with details of each POU. In step S104, the identification information is assigned for each POU included in the original program. This identification information is information for determining whether or not any change has been made to the control program, and the original program itself may be used. However, in order to reduce the amount of information, a hash value (or a message digest) computed from the data of the original program, attribute information of the original program (including, for example, an update date and time), or the like may be used. That is, the support device 200 computes identification information from a program code, a program object, or the like of each POU by using a hash function.

Subsequently, the support device 200 changes a target original program and an original variable table in accordance with a change operation by a program editing operator (step S106).

In the change operation on the original program and the original variable table in step S106, an operation within a range satisfying a limitation on the online edit function is permitted. Specifically, a process such as invalidating a menu screen, an operation screen or the like including an operation that conflicts with the limitation on the online edit function is executed. It is possible to more efficiently perform the change task by limiting an operation capable of being performed on the original program and the original variable table in advance without determining suitability for the limitation ex post facto when the changed control program is transferred to the PLC 100.

Also, depending on the version of the firmware of the PLC 100 serving as a change target of the program, the limitations on the online edit function may be different. In this case, if a firmware version of the PLC 100 can be acquired in advance, the limitations according to the acquired version may be applied. Alternatively, only operations allowed under the strictest limitations may be enabled.

Then, the support device 200 determines whether or not the completion of the change operation has been indicated (step S108). If the completion of the change operation has not been indicated (NO in step S108), the processing of step S106 and the following steps is iterated. When the completion of the change operation is indicated (YES in step S108), the support device 200 generates a changed POU in accordance with the change operation to any one POU constituting the control program and generates the changed variable table in accordance with a change operation on the variable table constituting the control program. That is, the support device 200 stores the changed control program (hereinafter also referred to as a "changed program") and the global variable table after change (hereinafter also referred to as a "changed variable table") (step S110) and stores identification information associated with the changed program (step S112).

Then, the support device 200 generates a data file to be transferred to the PLC 100 by using the changed program and the changed variable table (step S114). More specifically, the control program (source data) stored in the support device 200 is converted into a format required for execution by the PLC 100 (a type of compilation). In addition to the changed program and the changed variable table, this data file includes identification information associated therewith.

Subsequently, the support device 200 determines whether or not a connection to any one PLC 100 has been established (step S116). When the connection to any one PLC 100 has been established (YES in step S116), the support device 200 determines whether or not the transfer of the data file to the connected PLC 100 has been indicated (step S118). When the transfer of the data file is canceled (NO in step S118), the process is terminated.

When the transfer of the data file to the connected PLC 100 has been indicated (YES in step S118), the support device 200 acquires information associated with the changed program and the changed variable table of a control target included in the data file from the PLC 100 of the connection destination (step S120). Then, the support device 200 determines whether or not the transfer of the changed program and the changed variable table is possible by checking consistency on the basis of information acquired from the PLC 100 of the connection destination (step S122).

If it is determined that the changed program and the changed variable table cannot be transferred (NO in step S122), the support device 200 displays that the changed program and the changed variable table cannot be transferred to the PLC 100 (step S124). Then, the process proceeds to step S132.

On the other hand, if it is determined that the changed program and the changed variable table can be transferred (YES in step S122), the support device 200 provides a notification of a start of the transfer of the changed program and the changed variable table to the PLC 100 and receives a transfer start instruction (step S126). When the transfer of the changed program and the changed variable table is canceled (NO in step S126), the process proceeds to step S132.

When the transfer of the changed program and the changed variable table is indicated (YES in step S126), the support device 200 sequentially transfers the changed program and the changed variable table to the PLC 100 in accordance with a predetermined order (step S128). At this time, the support device 200 also transfers the identification information associated with one or more POUs included in the changed program to the PLC 100. That is, the support device 200 transfers the POU which is the unit program and the identification information associated with the POU to the PLC 100.

For the changed program, it is preferable to transfer necessary programs in units of POUs included therein. Also, the transfer order of the changed program and the changed variable table may also be appropriately optimized in accordance with a predetermined order or details of the changed program.

In this manner, the support device 200 transfers the changed POU to the PLC 100 in operation on condition that the same identification information as the identification information associated with the POU constituting the control program is present in the PLC 100.

Ultimately, when the support device 200 confirms that the transfer of the changed program and the changed variable table to the PLC 100 is completed (step S130), the support device 200 determines whether or not a connection to another PLC 100 has been established (step S132). When the connection to any other PLC 100 has been established (YES in step S132), the processing of step S118 and the following steps is iteratively executed.

If connection to any other PLC 100 has not been established (NO in step S132), the process ends.

<G. Consistency Checking Function>

Next, the consistency checking function (steps S120 to S122 of FIG. 5 and the like) implemented in the support device 200 according to the present embodiment will be described.

(g1: Checking Using Identification Information)

Figure 6:
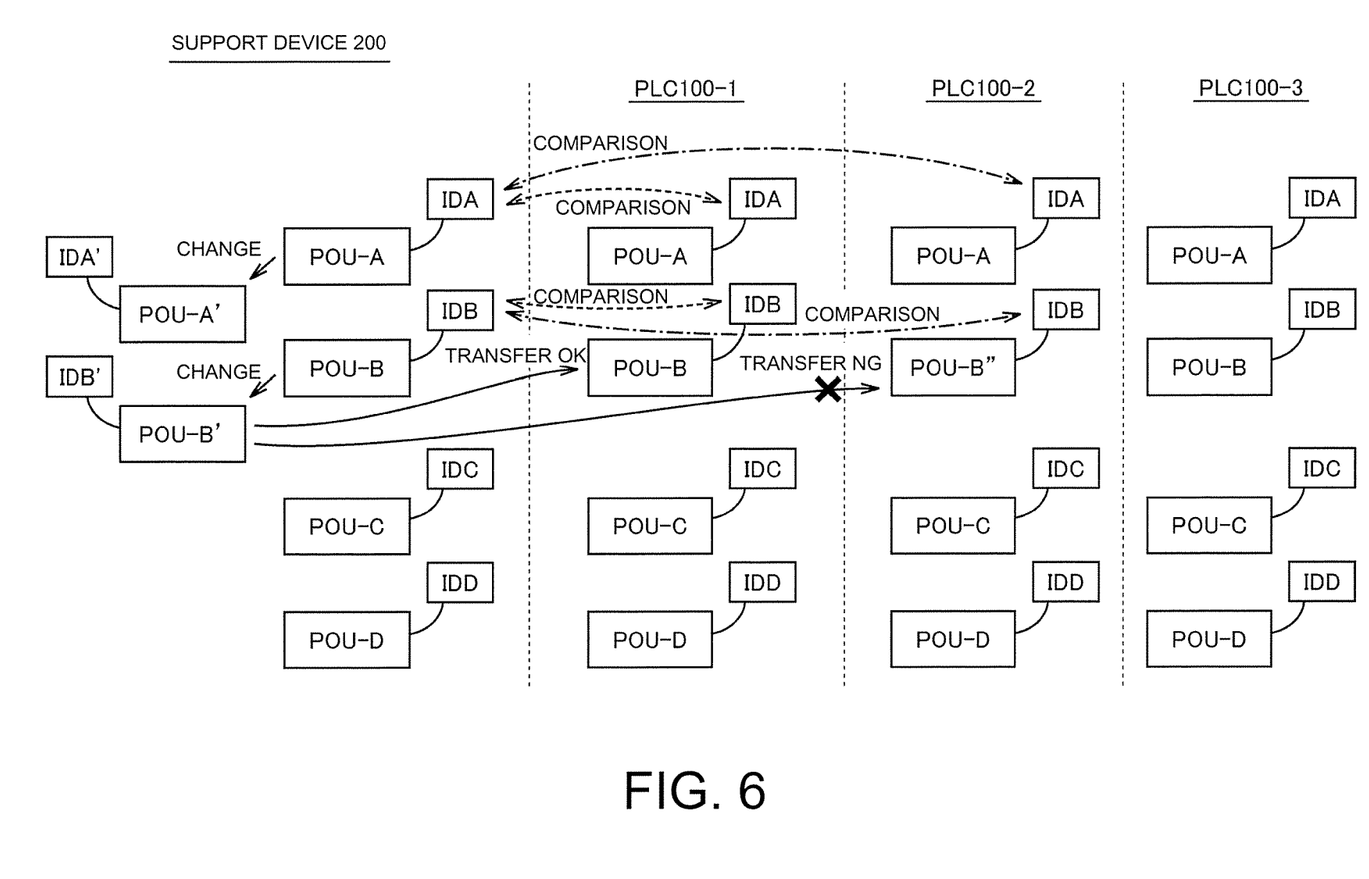
FIG. 6 is a schematic diagram illustrating checking using identification information by a consistency checking function implemented in the support device according to the present embodiment.

FIG. 6 is a schematic diagram illustrating checking using the identification information by the consistency checking function implemented in the support device 200 according to the present embodiment.

Referring to FIG. 6, the support device 200 is assumed to store four POUs (POU-A, POU-B, POU-C, and POU-D) as an original program. Identification information IDA, IDB, IDC, and IDD are associated with POU-A, POU-B, POU-C, and POU-D, respectively.

That is, the support device 200 is assumed to pre-execute a process of computing identification information in accordance with details of each unit program and a process of transferring a unit program and identification information associated with the unit program to the PLCs 100-1 to 100-3 which are control devices, with respect to each unit program constituting the user program (that is, for each of one or more POUs).

In this state, it is assumed that the program editing worker has made changes to POU-A and POU-B. That is, it is assumed that POU-A has been changed to POU-A' and POU-B has been changed to POU-B'.

Before the transfer, the support device 200 compares the identification information IDA associated with POU-A with the identification information associated with POU-A stored in each PLC 100. That is, the support device 200 checks whether or not the same control program as the control program (the original program) before the change is stored in the target PLC 100. The POU itself may be compared to check for the presence or absence of identity, but it is preferable to use identification information associated therewith.

If the control program (the original program) before the change is different from one stored in the PLC 100, there is a possibility that a malfunction in the PLC 100, stopping of an operation of the PLC 100, or the like may occur by transferring the changed control program (the changed program).

Although the control program stored in the support device 200 should be originally substantially the same as that stored in the PLC 100, there is a possibility that only the PLC 100 side may be changed due to a change operation by a third party or the like. Alternatively, a case in which maintenance staff or the like connect the support device 200 to a PLC 100 different from the PLC 100 serving as the change target or the like may be conceived.

Therefore, by using the consistency checking function according to the present embodiment, it is determined whether or not the original program stored in the support device 200 is the same as that stored in the PLC 100 before the transfer and a possibility of a malfunction in the PLC 100, stopping of an operation of the PLC 100, or the like is reduced.

In the example illustrated in FIG. 6, the support device 200 compares identification information IDA associated with the POU-A stored in the support device 200 with the identification information IDA associated with the POU-A stored in each PLC 100 and transfers POU-A' and identification information IDA' associated therewith to the target PLC 100 if they match.

Likewise, the support device 200 compares identification information IDB associated with POU-B stored in the support device 200 with identification information associated with POU-B stored in each PLC 100. In the example illustrated in FIG. 6, POU-B stored in the PLC 100-1 is the same as POU-B before the change stored in the support device 200 and the identification info nation IDB thereof also matches. On the other hand, the PLC 100-2 stores POU-B" different from the POU-B stored in the support device 200, and the identification information thereof does not match. Thus, the support device 200 does not transfer POU-B' obtained by changing POU-B to the PLC 100-2.

Also, if a part of the control program is also different from one stored in the target PLC 100, all of the transfer of the control program which is the change target may be canceled. Alternatively, only POUs matching those stored in the support device 200 and those stored in the target PLC 100 may be configured to be transferred.

(g2: Global Variable Table)

Figure 7:
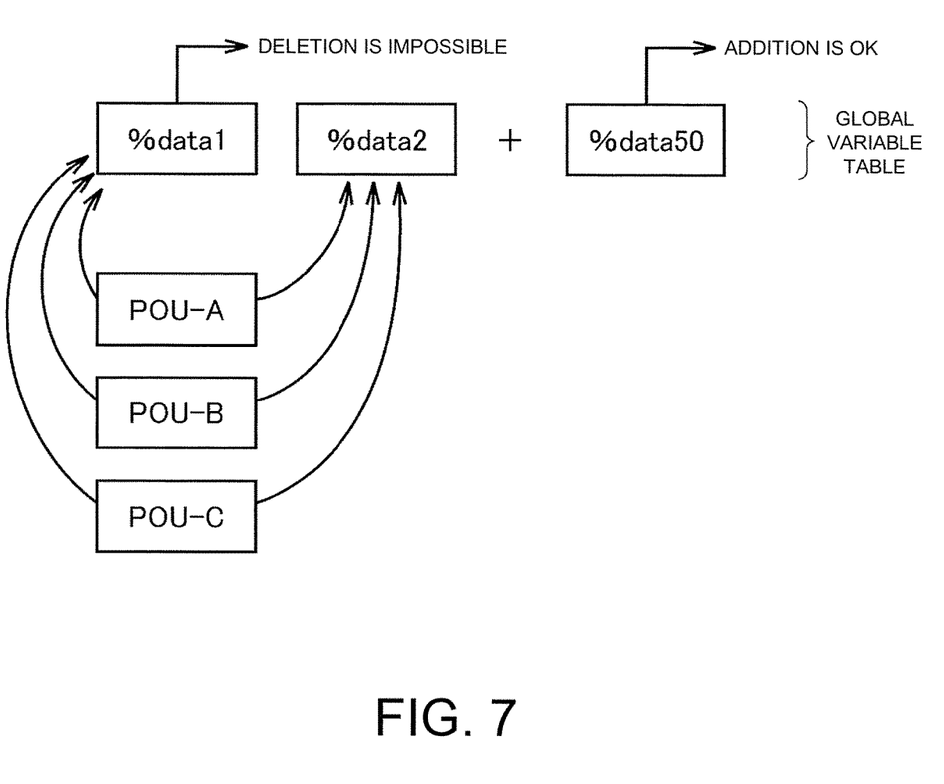
FIG. 7 is a schematic diagram illustrating checking details of a global variable table in the consistency checking function implemented in the support device according to the present embodiment.

Next, a global variable table will be described. FIG. 7 is a schematic diagram illustrating checking details of the global variable table in the consistency checking function implemented in the support device 200 according to the present embodiment.

Referring to FIG. 7, global variables (% data1, % data 2, . . . ) defined in the global variable table are referred to from one or more POUs. Thus, if the definition of an existing global variable is changed, the execution of one or more POUs may be affected. Thus, in the online edit function according to the present embodiment, a change of the global variable previously set in the global variable table is not permitted. However, it is possible to newly add a variable to the global variable table.

Thus, a possible change operation in the online edit function is limited to adding a new definition to the global variable table. In other words, it is necessary to compare the global variable table before the change stored in the support device 200 with the global variable table after the change and determine whether or not a difference therebetween is only a newly added portion.

The support device 200 compares the global variable table before the change stored in the support device 200 with the global variable table after the change and checks that all variables other than the changed variable match. Then, the support device 200 transfers the global variable table after the change to the PLC 100 on condition that all details of the global variable table before change are included in the global variable table after the change.

(g3: Processing Procedure of Consistency Checking Function)

Figure 8:
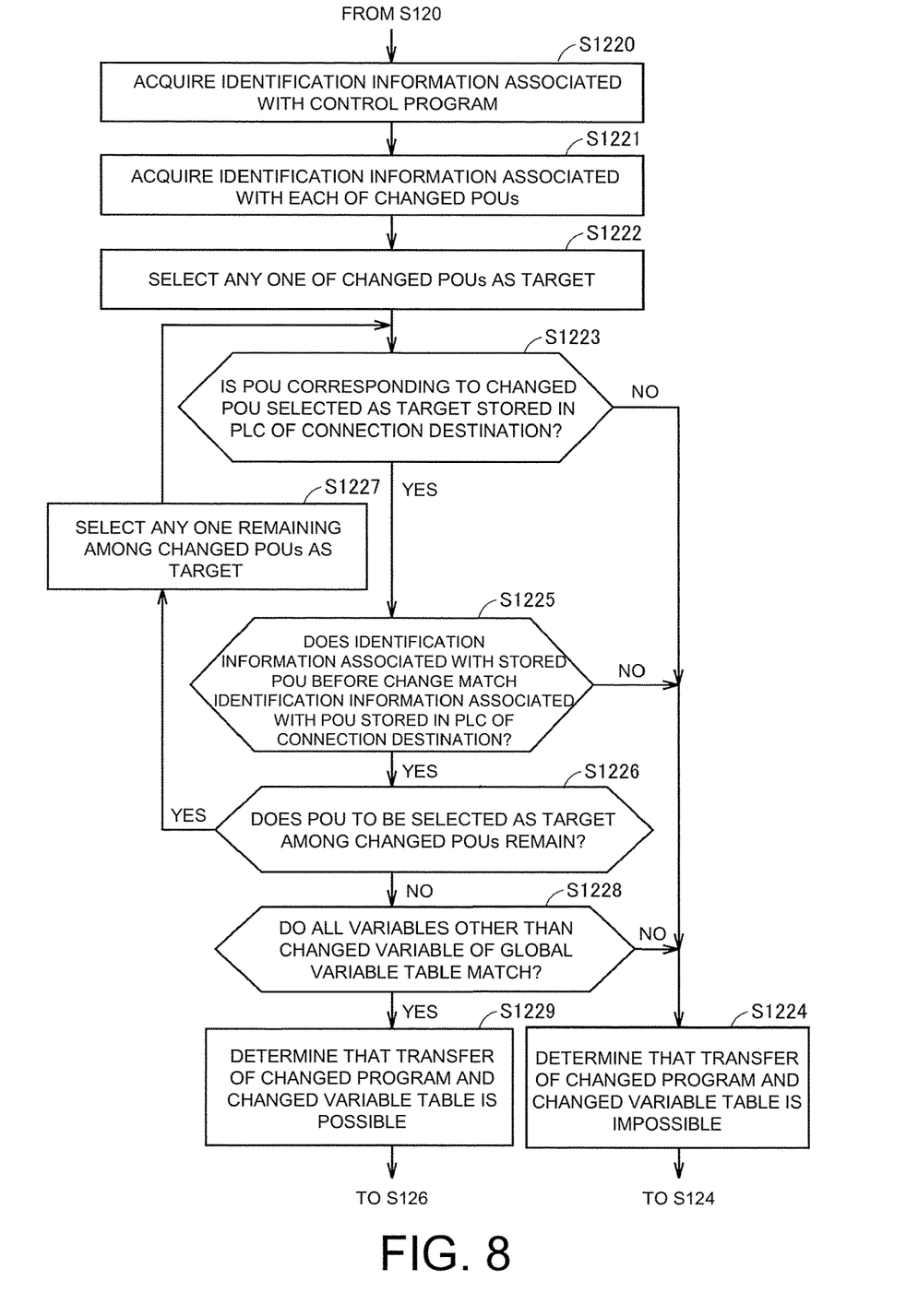
FIG. 8 is a flowchart illustrating a more detailed processing procedure in step S122 of the flowchart illustrated in FIG. 5.

Next, details of the determination as to whether or not the changed program and the changed variable table can be transferred in step S122 illustrated in FIG. 5 will be described. FIG. 8 is a flowchart illustrating a more detailed processing procedure in step S122 of the flowchart illustrated in FIG. 5.

Referring to FIG. 8, the support device 200 acquires identification information associated with each of the control programs (one or more POUs) stored before the change operation (step S1220). Subsequently, the support device 200 identifies a POU changed by the change operation from among the control programs (one or more POUs) and acquires identification information associated with each of the changed POUs (step S1221). Then, the following processing is executed on each of the changed POUs.

Specifically, the support device 200 selects any one of the changed POUs as a target (step S1222). It is determined whether or not a POU corresponding to a changed POU selected as the target is stored in a connection destination PLC 100 (step S1223).

If the corresponding POU is not stored in the connection destination PLC 100 (NO in step S1223), the support device 200 determines that it is impossible to transfer the changed program and the changed variable table (step S1224). Then, the processing of step S122 of FIG. 5 is completed.

If the corresponding POU is stored in the connection destination PLC 100 (YES in step S1223), the support device 200 determines whether or not the stored identification information associated with the POU before the change matches the identification information associated with the POU corresponding to the POU before the change stored in the connection destination PLC 100 (step S1225).

If the two pieces of the identification information do not match (NO in step S1225), the support device 200 determines that it is impossible to transfer the changed program and the changed variable table (step S1224). Then, the processing of step S122 of FIG. 5 is completed.

If the two pieces of the identification information match (YES in step S1225), the support device 200 determines whether or not a POU to be selected as a target among the changed POUs remains (step S1226). If a POU to be selected as the target among the changed POUs remains (YES in step S1226), the support device 200 selects any one remaining POU among the changed POUs as the target (step S1227) and the processing of step S1223 and the following steps is executed.

If a POU to be selected as a target among the changed POUs does not remain (NO in step S1226), the support device 200 compares the global variable table before the change and the global variable table after the change stored in the support device 200 and determines whether or not all variables other than the changed variable match (step S1228). If all variables other than the changed variable do not match (NO in step S1228), the support device 200 determines that it is impossible to transfer the changed program and the changed variable table (step S1224). Then, the processing of step S122 of FIG. 5 is completed.

On the other hand, if all variables other than the changed variable match (YES in step S1228), the support device 200 determines that the changed program and the changed variable table can be transferred (step S1229). Then, the processing of step S122 of FIG. 5 is completed.

In this manner, the support device 200 transfers the changed POU to the PLC 100 on condition that all of corresponding identification information is present in the PLC 100 with respect to each of one or more POUs subjected to any change operation among a plurality of POUs constituting the control program.

(g4: Conclusion)

As described above, the consistency checking function implemented in the support device 200 according to the present embodiment uses identification information or the like to determine whether or not there is a control program (POU) of the change target in the PLC 100 and whether or not the control program before the change matches the control program stored in the PLC 100.

Further, the consistency checking function implemented in the support device 200 according to the present embodiment determines whether or not variables other than the changed portion match between a global variable table (an original variable table) before the change stored in the support device 200 and the changed global variable table (the changed variable table).

By checking whether or not such a configuration matches and checking whether or not consistency of data of a change target can be maintained, a possibility of occurrence of a malfunction or stopping of an operation of the PLC 100 which may occur in a rewrite task using the online edit function is reduced.

<H. Change Operation Limit Function>

In general, details capable of being modified using the online edit function (a change function on the control program in an operating state) are limited as compared with a case in which uploading is performed in a state in which the PLC 100 is stopped.

Specifically, the following limitations are assumed.
  Addition of a new POU (or a ladder section)
  Deletion of an existing POU (or a ladder section)
  Deletion of a variable defined in an existing variable table
  Replacement of a variable order in an existing variable table That is, in the online edit function, it is necessary to maintain the consistency of information necessary for executing the program before and after the change. Therefore, when such an online edit function is being executed, it is preferable to limit the change operation capable of being executed by the user to a range that satisfies this limitation. That is, when the online edit function is validated after the support device 200 activates the editing screen of the control program, only an operation satisfying the limitation of the online edit function may be validated. In this manner, by limiting a user operation on the editing screen of the control program, it is possible to reduce the possibility of a malfunction in the PLC 100 or stopping of an operation of the PLC 100. That is, the support device 200 limits the change operation of which an instruction is possible so that the change operation is suitable for a limitation when the changed POU is transferred to the PLC 100 in operation.

Figure 9A:
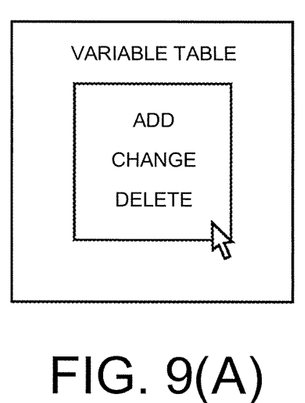
FIG. 9(A) and FIG. 9(B) are a schematic diagram illustrating a function of limiting a change operation implemented in the support device according to the present embodiment.
Figure 9B:
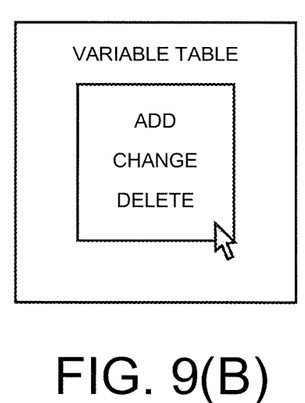

FIG. 9(A) and FIG. 9(B) are a schematic diagram illustrating a function of limiting a change operation implemented in the support device 200 according to the present embodiment. An example of an editing screen for the global variable table is illustrated as an example in FIG. 9(A). On this editing screen, it is possible to add a new variable, change the setting of the variable, and delete a registered variable with respect to the global variable table.

On the other hand, an example of the editing screen in a state in which the online edit function is validated is illustrated in FIG. 9(B). In this editing screen, an operation of adding a new variable to the global variable table is enabled, and a change in a setting of the variable and deletion of the registered variable are invalidated. This corresponds to deletion of the variables defined in the existing variable table and replacement of the variable order in the existing variable table as limited items as described above.

The present invention is not limited to the example of the limited function as illustrated in FIG. 9(A) and FIG. 9(B) and it is preferable to limit the user operation according to a limitation imposed by the online edit function.

<I. Adjustment of Transfer Order>

In step S128 of the flowchart illustrated in FIG. 5 described above, a transfer order of a changed program and a changed variable table may be predetermined or may be changed in accordance with details of the control program.

In the online edit function, basically, the global variable table is first transferred (updated) and then the control program (each POU) is sequentially transferred (updated). Because there is a possibility that one or more POUs included in the control program may independently access variables appropriately set in the global variable table, it is preferable to update the global variable table before updating these POUs.

However, depending on the program structure of the control program, the POU may be first updated and then the global variable table may be updated. Therefore, the support device 200 according to the present embodiment is configured to arbitrarily change or set an order in which the control program and the global variable table are transferred. That is, the support device 200 transfers a variable table and one or more POUs of a transfer target in a predetermined order or in a designated order.

As a default transfer order, for example, an order in which the editing operation is performed, an example in which data located in a lower layer in the data structure as illustrated in FIG. 4 is transferred earlier and an example in which data located in an upper layer in the data structure as illustrated in FIG. 4 is transferred earlier may be assumed.

The support device 200 refers to various types of information as described above and determines a data transfer order.

Figure 10:
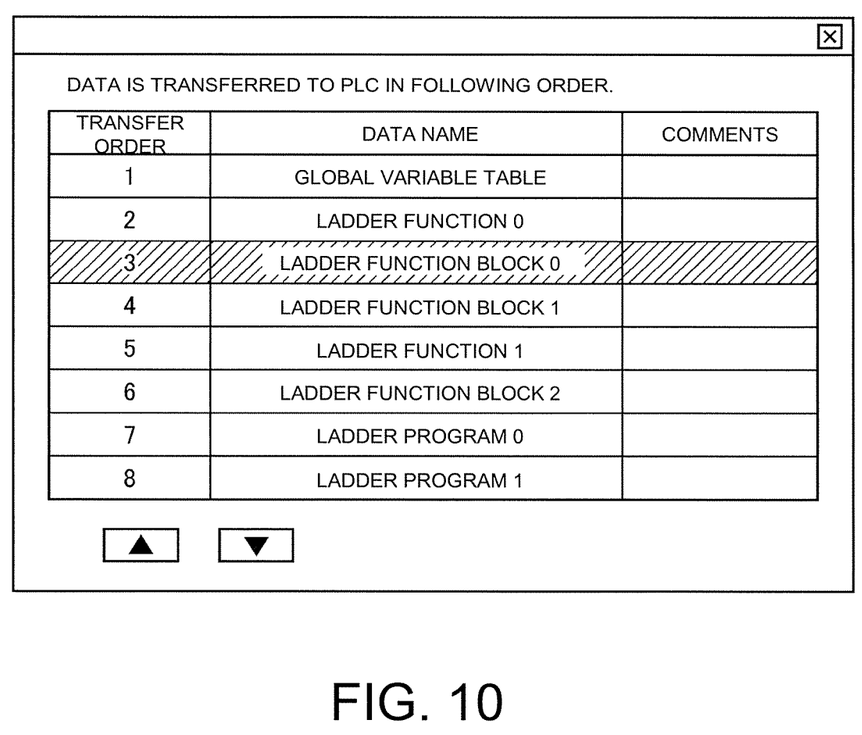
FIG. 10 is a diagram illustrating an example of a user interface screen for setting a transfer order provided by the support device according to the present embodiment.

FIG. 10 is a diagram illustrating an example of a user interface screen for setting the transfer order provided by the support device 200 according to the present embodiment. Referring to FIG. 10, for example, a list of data of a transfer target (a global variable table, a ladder program, a ladder function, a ladder function block, etc.) is displayed and a display order thereof corresponds to a transfer order. On this user interface screen, the user can appropriately change the data transfer order by operating an up arrow button or a down arrow button.

Regarding the data transfer order, the support device 200 may analyze details of the program to determine the most suitable order. For example, an order of data to be transferred or the like may be optimized in accordance with a characteristic value (a hardware specification, a firmware version, or the like) of the PLC 100 connected to the support device 200. That is, the support device 200 may determine the transfer order of the global variable table and one or more POUs of the transfer target in accordance with the characteristic value of the transfer destination PLC 100.

<J. Program Execution Start Timing in PLC>

The changed program and the changed variable table are transferred to the PLC 100 by the online edit function according to the present embodiment and a timing at which the PLC 100 starts executing the transferred changed program and the changed variable table may be appropriately set.

Figure 11A:
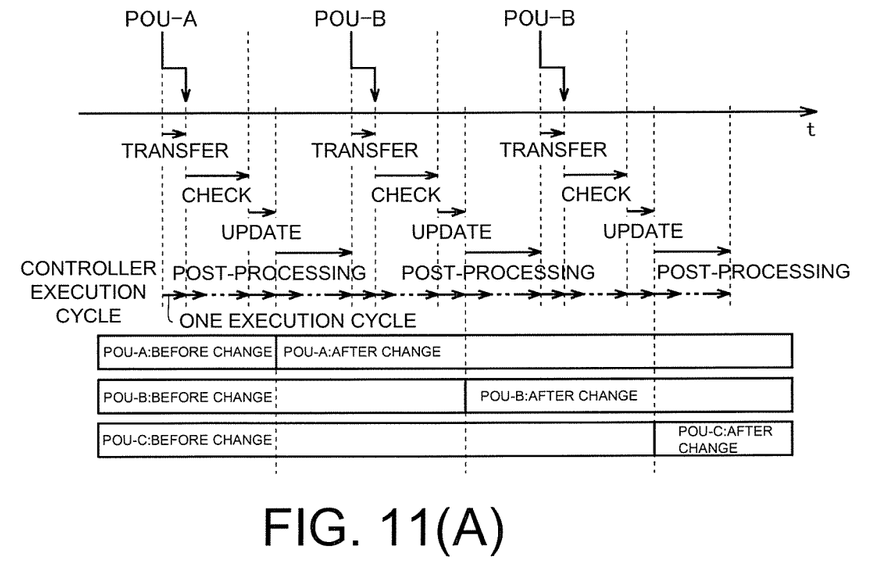
FIG. 11(A) and FIG. 11(B) are a diagram illustrating an execution start timing of a control program transferred by an online edit function according to the present embodiment.
Figure 11B:
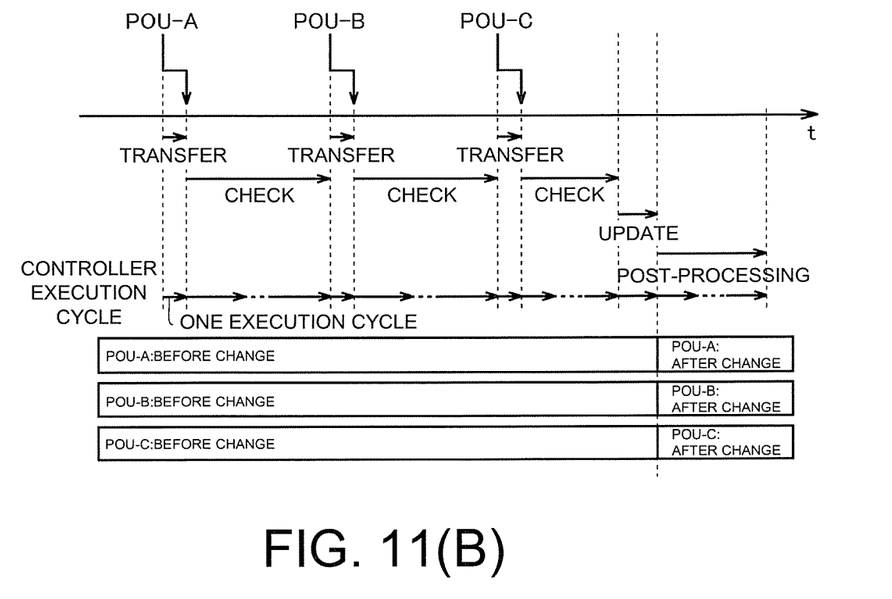

FIG. 11(A) and FIG. 11(B) are a diagram illustrating the execution start timing of the control program transferred by the online edit function according to the present embodiment. A processing example when three POUs (POU-A, POU-B, and POU-C) are sequentially transferred is illustrated in FIG. 11(A) and FIG. 11(B).

An example in which, when the transfer of each POU is completed, the execution of the POU whose transfer has been completed is started without waiting for the execution of another POU is illustrated in FIG. 11(A). An example in which the execution of three POUs is started simultaneously after the transfer of three POUs is completed is illustrated in FIG. 11(B). In FIG. 11(A) and FIG. 11(B), one of arrows (described as the controller execution cycle indicates one of the controller execution cycles.

According to the method illustrated in FIG. 11(A), because the storage area for holding the POU before and after the change is minimized in each PLC 100, the online edit function can be implemented even when there is a hardware constraint.

According to the method illustrated in FIG. 11(B), although it is necessary to use available hardware because a storage area for storing all POUs before and after change is necessary in each PLC 100, a problem such as a synchronous deviation is unlikely to occur because all changed POUs are simultaneously switched even when devices to be controlled by a plurality of POUs are associated with each other.

The support device 200 according to the present embodiment may automatically select any mode in accordance with a characteristic value (a hardware specification, a firmware version, or the like) of the connection destination PLC 100 or the user may explicitly select any mode.

<K. Advantages>

According to the support device 200 according to the present embodiment, even when a control program changing operation is performed on the PLC 100 in operation, it is possible to reduce the possibility of a malfunction in the PLC 100 or stopping of an operation of the PLC 100.

Also, according to the support device 200 according to the present embodiment, because the control program changing operation can be further simplified, a task can be more easily completed in a short time even when it is necessary to perform the same modification on control programs to be executed in a plurality of PLCs 100.

The presently disclosed embodiments should be considered in all respects as illustrative and not restrictive. The scope of the present invention is indicated by the appended claims, rather than the foregoing description, and all changes which come within the meaning and range of equivalency of the claims are therefore intended to be embraced therein.

What is claimed is:

1. A support device for supporting development of a control program to be executed in a control device that controls a control target, the support device comprising a processor configured to:
   compute identification information in accordance with details of each unit program with respect to each unit program constituting the control program;
   transfer a unit program and identification information associated with the unit program to the control device;
   generate a changed unit program in accordance with a change operation on any one unit program constituting the control program; and
   transfer the changed unit program to the control device in operation on condition that the same identification information as identification information associated with a unit program constituting the control program is present in the control device,
   wherein the processor generates a changed variable table in accordance with a change operation on a variable table referring to the control program, and the processor transfers the changed variable table to the control device, wherein the variable table includes a plurality of variables that are referred to from the control program, all values the plurality of variables of the variable table before the change operation are included in the changed variable table, the processor transfers a variable table of a transfer target and one or more unit programs in a predetermined order or a designated order, and the processor determines the transfer order of the variable table of the transfer target and the one or more unit programs in accordance with a characteristic value of the control device of a transfer destination.

2. The support device according to claim 1, wherein the processor transfers the changed unit program to the control device on condition that all of corresponding identification information is present in the control device with respect to each of one or more unit programs on which any change operation is performed among a plurality of unit programs constituting the control program.

3. The support device according to claim 1, wherein the processor computes the identification information from a program code or a program object of each unit program by using a hash function.

4. The support device according to claim 1, wherein the processor limits a change operation which can be instructed so that the change operation is suitable for a limitation when the changed unit program is transferred for the control device in operation.

5. A method executed in a support device for supporting development of a control program executed in a control device that controls a control target, the method comprising the steps of:
   computing identification information in accordance with details of each unit program with respect to each unit program constituting a first program;
   transferring a unit program and identification information associated with the unit program to the control device;
   generating a changed unit program in accordance with a change operation on any one unit program constituting the first program;
   transferring the changed unit program to the control device in operation on condition that the same identification information as identification information associated with a unit program constituting the control program is present in the control device;
   generating a changed variable table in accordance with a change operation on a variable table referring to the control program;
   transferring the changed variable table to the control device, wherein the variable table includes a plurality of variables that are referred to from the control program, and all values the plurality of variables of the variable table before the change operation are included in the changed variable table;
   transferring a variable table of a transfer target and one or more unit programs in a predetermined order or a designated order; and
   determining the transfer order of the variable table of the transfer target and the one or more unit programs in accordance with a characteristic value of the control device of a transfer destination.

6. A non-transitory recording medium storing a support program for implementing a support device for supporting development of a control program to be executed in a control device that controls a control target, the support program causing a computer to:
   compute identification information in accordance with details of each unit program with respect to each unit program constituting a first program;
   transfer a unit program and identification information associated with the unit program to the control device;
   generate a changed unit program in accordance with a change operation on any one unit program constituting the first program; and
   transfer the changed unit program to the control device in operation on condition that the same identification information as identification information associated with a unit program constituting the control program is present in the control device,
   wherein the support program causing the computer to generate a changed variable table in accordance with a change operation on a variable table referring to the control program, and transfer the changed variable table to the control device, wherein the variable table includes a plurality of variables that are referred to from the control program, and all values the plurality of variables of the variable table before the change operation are included in the changed variable table,
   the support program causing the computer to transfer a variable table of a transfer target and one or more unit programs in a predetermined order or a designated order, and
   the support program causing the computer to determine the transfer order of the variable table of the transfer target and the one or more unit programs in accordance with a characteristic value of the control device of a transfer destination.

* * * * *